United States Patent
Li et al.

(10) Patent No.: US 10,397,491 B2
(45) Date of Patent: Aug. 27, 2019

(54) PHOTOGRAMMETRY SYSTEM AND PHOTOGRAMMETRY METHOD

(71) Applicant: NUCTECH COMPANY LIMITED, Beijing (CN)

(72) Inventors: Mingliang Li, Beijing (CN); Yuanjing Li, Beijing (CN); Jianmin Li, Beijing (CN); Ying Li, Beijing (CN); Zhiqiang Chen, Beijing (CN); Kejun Kang, Beijing (CN)

(73) Assignee: NUCTECH COMPANY LIMITED, Beijing (CN)

( * ) Notice: Subject to any disclaimer, the term of this patent is extended or adjusted under 35 U.S.C. 154(b) by 66 days.

(21) Appl. No.: 14/981,947

(22) Filed: Dec. 29, 2015

(65) Prior Publication Data

US 2016/0253822 A1 Sep. 1, 2016

(30) Foreign Application Priority Data

Dec. 29, 2014 (CN) .......................... 2014 1 0831553

(51) Int. Cl.
*G06T 7/60* (2017.01)
*H04N 5/247* (2006.01)
(Continued)

(52) U.S. Cl.
CPC ............. *H04N 5/247* (2013.01); *G01B 11/04* (2013.01); *G01C 11/06* (2013.01); *G01P 3/68* (2013.01);
(Continued)

(58) Field of Classification Search
CPC ... G06T 2207/10016; G06T 7/20; G06T 7/60; G06T 2207/30236; G06T 2207/30248; G06T 7/292; G01C 11/06; G01B 11/04
See application file for complete search history.

(56) References Cited

U.S. PATENT DOCUMENTS 6,668,082 B1 * 12/2003 Davison .................... G06T 7/55
345/419
6,959,108 B1 * 10/2005 Bartelt .................. G06T 7/0004
348/125
(Continued)

FOREIGN PATENT DOCUMENTS

CN 101514993 A 8/2009
CN 105346975 A 2/2016
(Continued)

*Primary Examiner* — Shaghayegh Azima
(74) *Attorney, Agent, or Firm* — Kilpatrick Townsend & Stockton LLP

(57) ABSTRACT

The present invention relates to a photogrammetry system and method. The photogrammetry system comprises: photographing devices capable of photographing an object at a predetermined time interval; and, a data processing device capable of calculating an actual length of the object or a certain portion on the object according to a length of the object or a certain portion on the object in the images obtained by the photographing devices and a distance of the object in the two images, wherein the object moves at a speed V; the photographing devices photograph the object for two times at a time interval t; the distance of the object in the two images obtained by the two times of photographing is Dp; the length of the object or a certain portion on the object in the images is Lp; and, the actual length L of the object or a certain portion on the object may be obtained by the following formula:

$$L = Lp \times \frac{Vt}{Dp}.$$

3 Claims, 8 Drawing Sheets

(51) Int. Cl.
  *G01C 11/06* (2006.01)
  *G01P 3/68* (2006.01)
  *G01B 11/04* (2006.01)
  *G06T 7/292* (2017.01)

(52) U.S. Cl.
  CPC ............ *G06T 7/292* (2017.01); *G06T 7/60* (2013.01); *G06T 2207/10016* (2013.01); *G06T 2207/30236* (2013.01); *G06T 2207/30248* (2013.01)

(56) References Cited

U.S. PATENT DOCUMENTS

| | | | | |
|---|---|---|---|---|
| 2005/0021201 A1* | 1/2005 | Klotz | ............... | B60W 30/16 702/189 |
| 2005/0072902 A1* | 4/2005 | Visee | ............... | G01P 3/68 250/208.1 |
| 2005/0200857 A1* | 9/2005 | Christ, Jr. | ............... | G01B 11/2509 356/601 |
| 2007/0222553 A1* | 9/2007 | Lim | ............... | H04N 5/232 340/3.1 |
| 2008/0260262 A1* | 10/2008 | Lim | ............... | G01B 11/04 382/218 |
| 2009/0079960 A1* | 3/2009 | Chung | ............... | G01S 17/023 356/28 |
| 2010/0020074 A1* | 1/2010 | Taborowski | ............... | G06T 7/70 345/420 |
| 2010/0173269 A1* | 7/2010 | Puri | ............... | G09B 19/0092 434/127 |
| 2010/0290665 A1* | 11/2010 | Sones | ............... | G01B 11/024 382/100 |
| 2011/0157373 A1* | 6/2011 | Ye | ............... | G06T 7/85 348/187 |
| 2012/0050528 A1* | 3/2012 | Davies | ............... | G01C 11/02 348/136 |
| 2012/0056999 A1* | 3/2012 | Handa | ............... | G01B 11/245 348/48 |
| 2013/0275080 A1* | 10/2013 | Wang | ............... | G01P 3/68 702/149 |
| 2014/0022336 A1* | 1/2014 | Ou-Yang | ............... | G03B 35/08 348/36 |
| 2014/0063512 A1* | 3/2014 | Takeuchi | ............... | G06K 15/1843 358/1.2 |
| 2015/0304568 A1* | 10/2015 | Ikeda | ............... | H04N 5/23222 348/222.1 |
| 2016/0071272 A1* | 3/2016 | Gordon | ............... | G06T 7/80 348/48 |
| 2016/0292888 A1* | 10/2016 | Arita | ............... | G01B 11/24 |

FOREIGN PATENT DOCUMENTS

| | | |
|---|---|---|
| CN | 105438755 A | 3/2016 |
| TW | 1378235 B | 12/2012 |

* cited by examiner

# PHOTOGRAMMETRY SYSTEM AND PHOTOGRAMMETRY METHOD

The present application claims the priority to Chinese Patent Applications No. 201410831553.1, filed with the Chinese State Intellectual Property Office on Dec. 29, 2014, which is incorporated herein by reference in its entirety.

FIELD OF THE INVENTION

The present invention relates to a photogrammetry system and a photogrammetry method.

BACKGROUND OF THE INVENTION

The speed measurement and length measurement of a moving object are greatly demanded in the production and life Radar speed measurement instruments have limited service life and limited accuracy. In addition, the laser speed measurement is high in cost. The length measurement of a moving article on a production line is an important means for quality control and product grading. Further, the length measurement is the basis of size measurement and accurate measurement and control. However, the measurement of a moving object is a challenging technical problem. Low-cost measurement means should be a direction of human pursuit, and its development and applications will certainly facilitate the development of related technologies and promote the living quality and production level of people.

Moreover, the measurement of running vehicles is an important problem in the traffic control and safety check. During various types of scanning to vehicles, particularly during X-ray scanning, the measurement and control on running vehicles are highly required. The use of length measurement and speed measurement means having a high cost performance is a key basis of the measurement and control.

For a top irradiation type X-ray check system that is developed recently, to avoid the effects of a dragging device on a scan image, relay type dragging is introduced (that is, front and rear dragging devices are respectively used for dragging) so as to achieve steady and seamless relay type dragging. However, how to realize accurate measurement and control is also a key of affecting the quality of a scan image.

SUMMARY OF THE INVENTION

To solve the above problem, an objective of the present invention is to provide a photogrammetry system and photogrammetry method for measuring the speed and length of a moving object by photography. The present invention may perform measurement using a simple structure and thus reduce measurement cost, and may obtain accurate results of measurements.

To achieve the above objective, the present invention provides a photogrammetry system, including:

photographing devices in a direction substantially perpendicular to a direction of movement of an object to be measured with respect to the photographing devices, the photographing devices being able to photograph the object to be measured for at least two times at a predetermined time interval to obtain at least two images, respectively; and a data processing device, which calculates, according to a length of the object to be measured or at least one portion of the object to be measured in the images obtained by the photographing devices, a transverse movement distance of the object to be measured or the at least one portion of the object to be measured in the two images and a speed of the object to be measured, an actual length of the object to be measured or the at least one portion of the object to be measured.

Moreover, in the photogrammetry system of the present invention:

the photogrammetry system further includes a speed measurement device for measuring a speed of the object to be measured in the direction of movement with respect to the photographing devices.

Moreover, in the photogrammetry system of the present invention:

the object to be measured moves at a speed V, and the photographing devices photograph the object to be measured for two times at a time interval t; and the transverse movement distance of the object to be measured in the two images obtained by the two times of photographing is Dp, the length of the object to be measured or the at least one portion of the object to be measured in the images is Lp, and the actual length L of the object to be measured or the at least one portion of the object to be measured may be obtained by the following formula:

$$L = Lp \times \frac{Vt}{Dp}.$$

Moreover, in the photogrammetry system of the present invention:

the object to be measured is stationary, and the photographing devices move at a speed V in a direction perpendicular to a photographing direction and photograph the object to be measured for two times at a time interval t; and the transverse movement distance of the object to be measured in the two images obtained by the two times of photographing is Dp, the length of the object to be measured or the at least one portion of the object to be measured in the images is Lp, and the actual length L of the object to be measured or the at least one portion of the object to be measured may be obtained by the following formula:

$$L = Lp \times \frac{Vt}{Dp}.$$

Moreover, in the photogrammetry system of the present invention:

the object to be measured is stationary, and the photographing devices photograph the object to be measured at two positions having a distance S therebetween to obtain two images, respectively; and the transverse movement distance of the object to be measured in the two images is Dp, the length of the object to be measured or the at least one portion of the object to be measured in the images is Lp, and the actual length L of the object to be measured or the at least one portion of the object to be measured may be obtained by the following formula:

$$L = Lp \times \frac{S}{Dp}.$$

Moreover, in the photogrammetry system of the present invention:

the two images are obtained by two photographing devices having the same parameters at two positions having a distance S therebetween.

Moreover, in the photogrammetry system of the present invention:

the photogrammetry system further includes another photographing device for photographing the object to be measured in a direction different from the photographing direction of the photographing devices, and the size of the object to be measured in a third dimension is obtained according to images obtained by the another photographing device.

Moreover, in the photogrammetry system of the present invention:

the photographing direction of the another photographing device is perpendicular to that of the photographing devices.

Moreover, in the photogrammetry system of the present invention:

the photogrammetry system includes two photographing devices, which are a first photographing device and a second photographing device successively arranged at a predetermined distance in a direction parallel to the direction of movement of the object to be measured, respectively; and the first photographing device photographs the object to be measured, the second photographing device shoots a video of the object to be measured, the data processing device retrieves frames of the video obtained by the second photographing device to obtain a frame most approximate to the picture obtained by the first photographing device and calculates a difference between the time of taking the picture and the time of taking the frame image so as to obtain a movement speed of the object to be measured.

Moreover, in the photogrammetry system of the present invention:

the data processing device extracts two frames from the video obtained by the second photographing device, and calculates a time interval t between the two frames; and the transverse movement distance of the object to be measured in the two frames is Dp, the length of the object to be measured or at least one portion of the object to be measured in the frame image is Lp, and the actual length L of the object to be measured or the at least one portion of the object to be measured is obtained by the following formula in combination with the obtained movement speed V of the object to be measured:

$$L = Lp \times \frac{Vt}{Dp}.$$

Moreover, in the photogrammetry system of the present invention:

the photogrammetry system further includes a first sensor, which is disposed downstream the first photographing device in a manner of having a predetermined distance L1 from the first photographing device in the direction of movement of the object to be measured; and, a second sensor, which is disposed downstream the second photographing device in a manner of having a predetermined distance L2 less than the predetermined distance L1 from the second photographing device in the direction of movement of the object to be measured;

the predetermined distance L2 is less than the predetermined distance L1, and the predetermined distance L2 is less than the length of the object to be measured in the direction of movement; and the first photographing device is activated when the first sensor detects that the object to be measured arrives, and the second photographing device is activated when the second sensor detects that the object to be measured arrives.

Moreover, in the photogrammetry system of the present invention:

the photogrammetry system further includes a third sensor, which is disposed upstream the second photographing device in the direction of movement of the object to be measured; and the second photographing device stops working when the third sensor detects that the object to be measured has passed through.

Moreover, in the photogrammetry system of the present invention:

the first photographing device is a camera, and the second photographing device is a video camera.

Moreover, in the photogrammetry system of the present invention:

the photogrammetry system includes two photographing devices, which are a first photographing device and a second photographing device successively arranged at a predetermined distance in a direction parallel to the direction of movement of the object to be measured, respectively;

the first photographing device is a single-shot camera, and the second photographing device is a camera capable of photographing for continuous multiple times;

several pictures most similar to the picture obtained by the first photographing device are found from a plurality of pictures obtained by the second photographing device, and an image consistent with the picture of the first photographing device is obtained by interpolation; or the position of a portion on the several most similar images is interpolated to obtain the position of the same portion on the single-shot image, and a photographing time corresponding to an interpolation image is obtained during interpolation; the photographing time has a time difference with the photographing time of the single-shot image; and, the movement speed of the object to be measured is calculated in combination with a distance from the first photographing device to the second photographing device;

in the case where the distance from the first photographing device to the second photographing device is S, the transverse movement distance of the object to be measured in the interpolation image and the single-shot image is Dp and the length of the object to be measured or at least one portion of the object to be measured in the images is Lp, the actual length L of the object to be measured or the at least one portion of the object to be measured may be obtained by the following formula:

$$L = Lp \times \frac{S}{Dp}.$$

Moreover, the present invention provides a photogrammetry method, including the following steps:

(a) in a direction substantially perpendicular to a direction of movement of an object to be measured with respect to photographing devices, photographing, by the photographing devices, the object to be measured for at least two times at a predetermined time interval to obtain at least two images, respectively; and (b) according to a length of the object to be measured or at least one portion of the object to be measured in the images obtained by the photographing devices, a transverse movement distance of the object to be measured or the least one portion of the object to be measured in the two images and a speed of the object to be measured, calculating an actual length of the object to be measured or the at least one portion of the object to be measured.

Moreover, in the photogrammetry method of the present invention:

the object to be measured moves at a speed V, and, in step (a), the photographing devices photograph the object to be measured for two times at a time interval t; and in step (b), the transverse movement distance Dp of the object to be measured in the two images obtained by the two times of photographing and the length Lp of the object to be measured or the at least one portion of the object to be measured in the images are obtained, and then the actual length L of the object to be measured or the at least one portion of the object to be measured is obtained by the following formula:

$$L = Lp \times \frac{Vt}{Dp}.$$

Moreover, in the photogrammetry method of the present invention:

the object to be measured is stationary, and, in step (a), the photographing devices move at a speed V in a direction perpendicular to a photographing direction and photograph the object to be measured for two times at a time interval t; and in step (b), the transverse movement distance Dp of the object to be measured in the two images obtained by the two times of photographing and the length Lp of the object to be measured or the at least one portion of the object to be measured in the images are obtained, and then the actual length L of the object to be measured or the at least one portion of the object to be measured is obtained by the following formula:

$$L = Lp \times \frac{Vt}{Dp}.$$

Moreover, in the photogrammetry method of the present invention:

the object to be measured is stationary, and, in step (a), the photographing devices photograph the object to be measured at two positions having a distance S therebetween to obtain two images, respectively; and in step (b), the transverse movement distance Dp of the object to be measured in the two images and the length Lp of the object to be measured or the at least one portion of the object to be measured in the images are obtained, and then the actual length L of the object to be measured or the at least one portion of the object to be measured is obtained by the following formula:

$$L = Lp \times \frac{S}{Dp}.$$

Moreover, in the photogrammetiy method of the present invention:

the two images are obtained by two photographing devices having the same parameters at two positions having a distance S therebetween.

Moreover, in the photogrammetiy method of the present invention:

the photogrammetry method further includes the following step (c): photographing, by another photographing device, the object to be measured in a direction different from the photographing direction of the photographing devices, and obtaining the size of the object to be measured in a third dimension according to images obtained by the another photographing device.

Moreover, in the photogrammetiy method of the present invention:

the photographing direction of the another photographing device is perpendicular to that of the photographing devices.

Moreover, in the photogrammetiy method of the present invention:

in the photogrammetry method, a first photographing device and a second photographing device successively arranged at a predetermined distance in a direction parallel to the direction of movement of the object to be measured are used; and in step (a), the first photographing device photographs the object to be measured, and the second photographing device shoots a video of the object to be measured; in step (b), frames of the video obtained by the second photographing device are retrieved to obtain a frame most approximate to the picture obtained by the first photographing device, and a difference between the time of taking the picture and the time of taking the frame image is calculated so as to obtain a movement speed of the object to be measured.

Moreover, in the photogrammetiy method of the present invention:

in step (b), two frames are extracted from the video obtained by the second photographing device, a time interval t between the two frames is calculated, the transverse movement distance Dp of the object to be measured in the two frames and the length Lp of the object to be measured or at least one portion of the object to be measured in the frame image are measured, and the actual length L of the object to be measured or the at least one portion of the object to be measured is obtained by the following formula in combination with the obtained movement speed V of the object to be measured:

$$L = Lp \times \frac{Vt}{Dp}.$$

Moreover, the present invention provides a photogrammetry system, including:

photographing devices in a direction substantially perpendicular to a direction of movement of an object to be measured with respect to the photographing devices, the photographing devices being able to photograph the object to be measured for at least two times at a predetermined time interval to obtain at least two images, respectively; and a data processing device, which calculates, according to a length of the object to be measured or at least one portion of the object to be measured in the images obtained by the photographing devices, a transverse movement distance of the object to be measured or the at least one portion of the object to be measured in the two images and an actual length of the object to be measured or the at least one portion of the object to be measured, a speed of the object to be measured.

Moreover, in the photogrammetry system of the present invention:

in the case where the actual length of the object to be measured or the at least one portion of the object to be measured is L, the length of the object to be measured or the at least one portion of the object to be measured in the images obtained by the photographing devices is Lp, the transverse movement distance of the object to be measured or the at least one portion of the object to be measured in the two images is Dp and the time interval of the two times of photographing is t, the data processing device calculates the movement speed V of the object to be measured according to the following formula:

$$V=(L \times Dp)/(Lp \times t).$$

Moreover, the present invention provides a photogrammetry method, including the following steps:

(a) in a direction substantially perpendicular to a direction of movement of an object to be measured with respect to photographing devices, photographing, by the photographing devices, the object to be measured for at least two times at a predetermined time interval t to obtain at least two images, respectively; and (b) measuring a length Lp of the object to be measured or at least one portion of the object to be measured in the images obtained by the photographing devices and a transverse movement distance Dp of the object to be measured or the least one portion of the object to be measured in the two images, and, in the case where an actual length of the object to be measured or the at least one portion of the object to be measured is L, calculating a movement speed V of the object to be measured according to the following formula:

$$V=(L \times Dp)/(Lp \times t).$$

Moreover, according to the present invention, it is easily expandable that the three-dimensional size of an object may be measured by two sets of measurement devices disposed around the moving object. This brings convenience to the grading and quality control of products on production lines, or other applications.

The system and method of the present invention have wide adaptability and do not need tedious appointment or calibration.

DETAILED DESCRIPTION OF THE EMBODIMENTS

Figure 1:
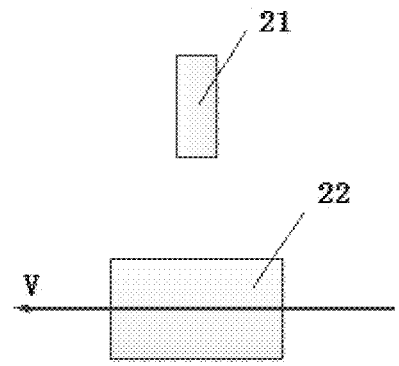
FIG. 1 is a schematic diagram of an implementation of a photogrammetiy system of the present invention.

The present invention will be described below in detail with reference to the accompanying drawings.

First, the structure and working principle of the present invention will be described. A photogrammetry system of the present invention includes: photographing devices, which is able to photograph an object to be measured for at least two times at a predetermined time interval to obtain at least two images, respectively; and, a data processing device, which calculates, according to a length of the object to be measured or at least one portion of the object to be measured in the images obtained by the photographing devices, a transverse movement distance of the object to be measured or the at least one portion of the object to be measured in the two images and a speed of the object to be measured, an actual length of the object to be measured or the at least one portion of the object to be measured. Moreover, the photogrammetry system may further include a speed measurement device which can measure a speed of the object to be measured in the direction of movement with respect to the photographing devices. In the present invention, if it is assumed that the movement speed of the object is V, the time interval of the two times of photographing is t, the distance of the object in the two images is Dp, the length of the object or a portion of the object in the images is Lp and the actual length of the object or a portion of object is L, the following formula (1) is formed, i.e., L/Lp=Vt/Dp. It can be seen from the formula (1) that, in the case where the movement speed V of the object is known, t is known as the time interval t may be set as required, so the length L of the object or a portion of the object may be obtained. Conversely, in the case where the length L of the object or a portion of the object is known, the movement speed of the object may be obtained according to the formula (1).

Moreover, during the measurement using the photogrammetry system of the present invention, it is preferable that the photographing devices are disposed in a direction perpendicular perpendicular to the direction of movement of the object for photographing, that is, the photographing direction is perpendicular to the direction of movement of the object. Moreover, for the time interval t, for purpose of the accuracy of measurement, t should not be too large. For example, t is less than the length of the object/V/n, where n is preferably an integer. For example, n is 10, 20, 30, etc.

Moreover, in the present invention, the photographing devices may be cameras or video cameras, but are not limited thereto. The photographing devices may also be other photographing devices as long as the images of the object may be acquired as required. In addition, the data processing device may be any device capable of performing calculation according to the formula (1), and is not specifically limited in the present invention. Moreover, as described above, the size of the object is measured when the object moves. Conversely, in the case where the object is static and the photographing devices are moved relative to the object, similar to the formula (1), the length of the object may also be measured.

Moreover, a photogrammetry method of the present invention includes the following steps: (a) in a direction substantially perpendicular to a direction of movement of an object with respect to photographing devices, photographing, by the photographing devices, the object for at least two times at a predetermined time interval t to obtain at least two images, respectively; (b) measuring a distance Dp of the object in the two images and a length Lp of the object or a portion of the object in the images; and, (c) in the case where the movement speed V of the object is known, according to a formula L/Lp=Vt/Dp, obtaining an actual length L of the object or the portion of the object, or in the case where the actual length L of the object or the portion of the object is known, according to the formula L/Lp=Vt/Dp, obtaining the movement speed V of the object.

The situation of obtaining the actual length of the object or a portion of the object in the case where the movement speed of the object may be measured or the movement speed of the object is known is described above, but the present invention is not limited thereto. The movement speed of the object may also be obtained in the case where the actual length of the object or a portion of the object is known.

Specifically, in the above-mentioned case, the photogrammetry system of the present invention includes: photographing devices for photographing an object to be measured for at least two times at a predetermined time interval to obtain at least two images, respectively; and, a data processing device, which calculates, according to a length of the object to be measured or at least one portion of the object to be measured in the images obtained by the photographing devices, a transverse movement distance of the object to be measured or the at least one portion of the object to be measured in the two images and an actual length of the object to be measured or the at least one portion of the object to be measured, a speed of the object to be measured. That is, the principle is similar to the principle of obtaining the actual length of an object or a portion of the object according to the formula (1), i.e.

$$\frac{L}{Lp} = \frac{Vt}{Dp},$$

where L is the actual length of the object or a portion of the object, Lp is the length of the object or a portion of the object in the images, V is the movement speed of the object, and t is the time interval between the two times of photographing. The movement speed, V=(L×Dp)/(Lp×t), of the object may be obtained according to the formula (1). Moreover, in the photogrammetiy system, the description of the time interval t, the photographing devices, the data processing device and the like is the same as the foregoing description.

Moreover, obtaining a speed of an object by the photographing method includes the following steps: (a) in a direction substantially perpendicular to a direction of movement of an object with respect to photographing devices, photographing, by the photographing devices, the object for at least two times at a predetermined time interval t to obtain at least two images, respectively; (b) measuring a distance Dp of the object in the two images and a length Lp of the object or a portion of the object in the two images; and, (c) obtaining a movement speed V of the object according to a formula V=(L×Dp)/(Lp×t) as an actual length L of the object or the portion of the object is known.

Several specific embodiments of the present invention will be shown as below. In FIG. 1, FIG. 3, FIG. 4 and FIG. 5, marks in the accompanying drawing are respectively as follows: 21 denotes a camera; 22 denotes a object; 23 denotes a rail; 24 denotes a video camera; 25 denotes a sensor 1; 26 denotes a sensor 2; 27 denotes a sensor 3.

Embodiment 1

FIG. 1 is a schematic diagram of embodiment 1 of a photogrammetry system of the present invention. As shown in FIG. 1, in the embodiment 1, the photographing devices are cameras, an object moves in a direction of arrow in FIG. 1 (i.e., a leftward direction in FIG. 1), and the object is photographed by the cameras disposed around a movement pathway of the object. Preferably, the cameras are perpendicular to the direction of movement of the object (that is, the cameras photograph the object in a direction perpendicular to the direction of movement of the object), but the present invention is not limited thereto. The cameras may also be arranged according to the requirements for installation convenience and measurement of the system.

During measurement, the cameras photograph the moving object for two times at a predetermined time interval t. In the case where the movement speed V of the object is known (including the case where the movement speed V of the object may be measured by the photogrammetry system), the movement distance of the object within the time interval of two times of photographing is Vt. If it is assumed that the distance of the object on the pictures obtained by two times of photographing is Dp and the length of a certain component on the object (or a portion of the object) on the pictures is Lp, it can be seen from the formula (1) that the actual length L of this component on the object satisfies the following formula (2):

$$L = Lp \times \frac{Vt}{Dp}. \tag{2}$$

Of course, the formula for measuring the length of a component on an object is also applicable to the measurement of the length of an object.

Moreover, if the length of the object or a portion of the object is known, the speed V or displacement (Vt) of movement of the object may be obtained by the formula (1).

As described above, the measurement method of the present invention is independent of a distance from the cameras to the object to be measured. In contrast, the conventional optical measurement heavily depends on the distance from the cameras to the object, needs to appoint a distance or make measurement calibration in advance and thus is time-consuming and labor-consuming. Moreover, the method of the present invention has wide adaptability and does not need tedious appointment or calibration. For example, the camera device of the present invention is mounted beside a road to measure a running vehicle in any lane of the broad road, and the method of the present invention may measure the speed or length. Moreover, for example, on a production line, the system and method of the present invention may adaptively measure the length (or speed) of different sizes of articles on a broad conveyor belt.

Figure 2:
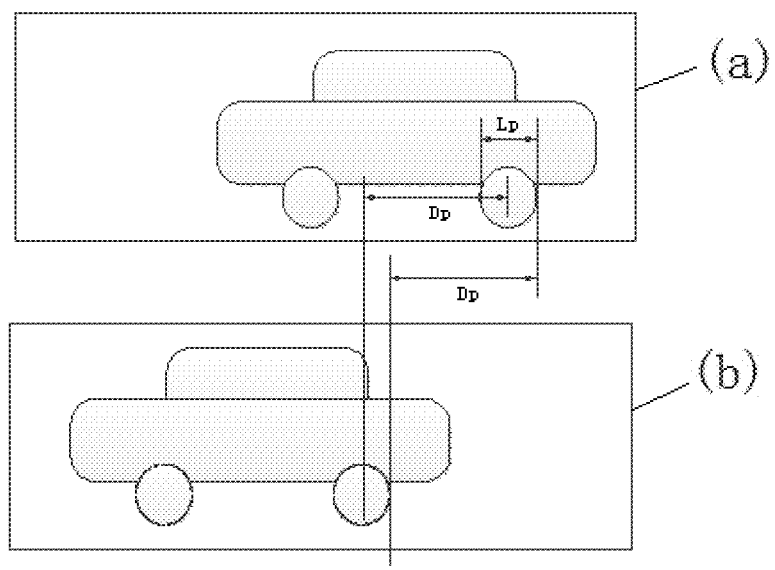
FIG. 2 is a schematic diagram of a calculation method for photogrammetry of the present invention.

Moreover, FIG. 2 shows the case of measuring a running vehicle. Specifically, as shown in FIG. 2, the case of measuring a diameter of a wheel of the vehicle is shown, where (a) denotes a picture obtained by a camera first time, and (b) denotes a picture obtained by the camera second time after a time interval t. Lp denotes the diameter of a front wheel of the vehicle in the pictures, and Dp denotes a distance of movement of the front wheel of the vehicle in the pictures during the time t. As both Lp and Dp may be directly measured according to the pictures shown by FIGS. 2(a) and (b), in the case where the running speed of the vehicle is known, the actual diameter L of the front wheel of the vehicle may be obtained according to the formula (2). Similarly, the length of the vehicle in the pictures is measured, and the actual length of the vehicle may be obtained according to the formula (2).

It is not hard to be seen from the formula (1) that, if the movement speed V of the object and the length of the object or a certain component on the object (or a portion of the object) are known, the time t may be measured. If the second time of photographing is triggered by a particular event, the exact time of occurrence of this event may be measured. This is of basic and important significance to the efficient measurement of basic physical quantities. Thus, more physical quantities may be calculated.

Embodiment 2

Embodiment 1 shows a self-adaptive measurement solution which may measure the speed of a moving object, the length of an object or a component thereof and the time interval. In contrast, this embodiment may adaptively measure the length of a static object.

According to the relativity of movement, an object is static, and a camera is moved at a speed −V (in a reverse direction of V), which is actually equivalent to the movement of embodiment 1. Accordingly, the length of the static object or a portion of the object may be measured by the same method.

In this embodiment, to further simplify the system, Vt in the formula (1) is equal to a distance interval of two times of photographing (i.e., a distance of movement of the camera during two times of photographing). The distance interval of the camera during two times of photographing may be set as S, a relative distance difference of the object in the pictures is Dp and the length of the object or a portion of the object in the pictures is Lp, the actual length L of the object or a portion of the object is obtained by the following formula (3):

$$L = Lp \times \frac{S}{Dp}. \qquad (3)$$

The formula (3) is similar to the formula (2), but the above Vt is replaced with the movement distance S of the camera. This is not required to accurately control the movement speed of the camera and reduces the complexity of the system. In this embodiment, a camera is only required to photograph the object at two positions having a distance S therebetween, and then Lp and Dp are measured such that the length may be obtained according to the formula (3).

Figure 3:
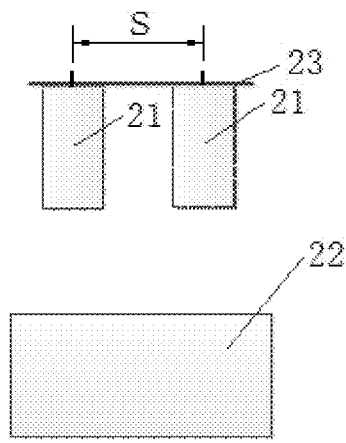
FIG. 3 is a schematic diagram of measurement of a static object.

Preferably, as shown in FIG. 3, the camera photographs the object at two positions having a distance S therebetween on a rail.

Moreover, as a variation of embodiment 2, i.e., as an alternative preferred solution, the movement of a camera may be replaced with two cameras having a distance S therebetween, but the two cameras should be calibrated consistently, that is, the parameters of the two cameras should be identical. A calibration method may be, for example, placing two cameras at the same position to photograph an object and making the shape and size of the object on the pictures obtained by the two cameras consistent. Of course, two different cameras calibrated in advance may also be used, but a camera calibration process is added.

Moreover, for embodiment 1 and embodiment 2, in FIG. 2, the measurement and calculation method of the length of an object or a portion of the object in a direction perpendicular to the direction of movement is the same as the above. Of course, after the measurement of length in a direction is completed, the length in another direction may be obtained according to a ratio of the length in another direction to the length in this direction in a picture. In embodiment 1 or embodiment 2, any length in the plane of a picture may be efficiently, adaptively and quickly measured.

Embodiment 3

In practical applications, to solve the measurement of the size in a three-dimensional direction, many methods may be taken into consideration, for example, using a 3D camera. For example, laser ranging or others are combined with the present invention.

Figure 4:
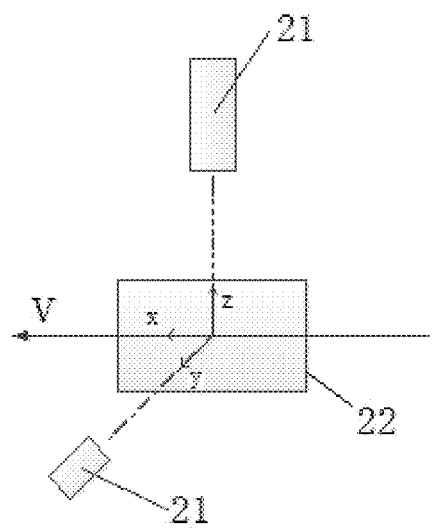
FIG. 4 is a schematic diagram of three-dimensional measurement.

However, in this embodiment, to further develop the self-adaptive photogrammetry solution of embodiment 1 and embodiment 2, as shown in FIG. 4, a set of camera of embodiment 1 (or embodiment 2) is disposed in another direction, so as to complete the measurement of the size in a third dimension. Preferably, the two cameras are perpendicular to each other. For example, as shown in FIG. 4, one of the cameras photographs along z-axis, while the other one photographs along y-axis. Then, the size of an object is measured according to the pictures obtained by photographing in the two directions.

Moreover, in a further simplified solution, the camera for photographing along the y-axis in FIG. 4 only photographs once, so that the size in the third dimension may be obtained according to a ratio of the length in the third dimension to the length in the former two dimensions in the picture obtained by photographing.

Embodiment 4

Figure 5:
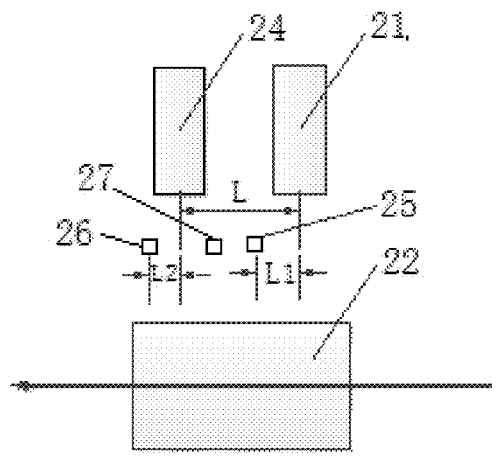
FIG. 5 is a schematic diagram of measurement for a dual-shot device.

This embodiment provides another photogrammetry solution. In this embodiment, as shown in FIG. 5, two photographing devices are successively arranged in a direction substantially parallel to the direction of movement of an object. Preferably, one photographing device is a camera, while the other photographing device is a video camera. The distance between the two photographing devices is L. Preferably, the two photographing devices photograph in a direction perpendicular to the direction of movement of the object.

In this embodiment, the camera photographs the moving object and the video camera shoots a video of the moving object. Then, frames of the obtained video are retrieved to find out a frame most approximate to the picture, and a difference between the time of taking the picture and the time of taking the frame image is calculated. Then, in combination with the known distance L between the camera and the video camera (as shown in FIG. 5), the movement speed of the object is obtained by dividing the distance L by the time difference. Further, to measure the length of the object or a portion of the object, two frames of the video are adopted. The two frames are equivalent to two times of photographing of one camera in embodiment 1, so the length of the object or a component on the object may be calculated according to the formula (2). Similarly, if the length of the object or a component on the object is known, the time difference between two frames may be calculated. This embodiment may simultaneously measure the movement speed of an object and the length of the object or a component on the object, which is an important advantage of this solution.

To save energy and protect environment and to also reduce the pressure of the system with respect to the storage, retrieval and processing of images, preferably, sensors may be provided in this embodiment. The sensors sense the arrival and pass of a moving object, and activate and close the photographing devices by using sensed signals. This improves the degree of automation of the system. Preferably, the sensors may be infrared sensors, electromagnetic sensors or other types of sensors. As shown in FIG. 5, it is assumed that a distance between a sensor 1 and the camera in the direction of movement of the object is L1, preferably, the sensor 1 is disposed downstream the direction of movement of the object relative to the camera; and, it is assumed that a distance between a sensor 2 and the video camera in the direction of movement of the object is L2, preferably, the sensor 2 is disposed downstream the direction of movement of the object relative to the video camera. If the sensor 1 or sensor 2 detects that the object arrives, a corresponding photographing device will be activated. In other words, if the sensor 1 detects that the object arrives, the camera is activated for photographing; and, if the sensor 2 detects that the object arrives, the video camera will be activated for shooting. In addition, for example, as shown in FIG. 5, L1 and L2 each are a length from the center of a sensor to the center of a photographing device in the direction of movement of the object. Of course, in order to retrieve, from the frame images obtained by the video camera, an image consistent with the image obtained by the camera, L1 and L2 should satisfy the following condition: L2<L1. In addition, L2 should be less than the length of the object to be measured. For example, L2 is ½, ⅓, ¼ or ⅕ of the length of the object. L2 may be flexibly selected according to the key point of measurement.

Preferably but not necessarily, as shown in FIG. 5, a sensor 3 may be further provided. The sensor 3 is disposed upstream the direction of movement of the object relative to the video camera. When the sensor 3 detects that the object has passed through, the video camera is triggered to stop working.

In addition, the positions of the two photographing devices in this embodiment may be exchanged and are not limited to the configuration mode shown in FIG. 5. In addition, the camera in this embodiment may be replaced with a video camera, such that the frame images obtained by the two video cameras are retrieved with each other, or a calculation method such as statistical averaging may be used to improve the accuracy of measurement. Moreover, the video camera in this embodiment may also be replaced with a camera capable of photographing for multiple times. As the number of images obtained by multiple times of photographing may be less than the number of frames of a video, the processing method may be as follows: (I) several images most similar to the picture obtained by a single-shot camera are found from limited pictures obtained by the multiple times of photographing; (II) an image consistent with the single-shot image is obtained by interpolation, or the position of a certain component on the several most similar images is interpolated to obtain the position of the same component on the single-shot image; (III) a photographing time corresponding to an interpolation image is obtained during interpolation, the photographing time has a time difference with the photographing time of the single-shot image, and the movement speed of the object may be calculated in combination with a distance value between the two photographing devices; and, (IV) the size of the object or a portion thereof is calculated according to the speed and the images obtained by multiple times of photographing and in combination with the formula (1).

In addition, the measurement device in this embodiment may replace the camera in embodiment 3 to realize three-dimensional measurement.

As described above, the specific embodiments of the photogrammetry system and photogrammetry method of the present invention have been described. Application examples of the photogrammetry system of the present invention will be illustrated below.

Application Examples

The case where the photogrammetry system of the present invention is applied to a vehicle dragging system to be accurately measured and controlled will be described below.

Figure 6:
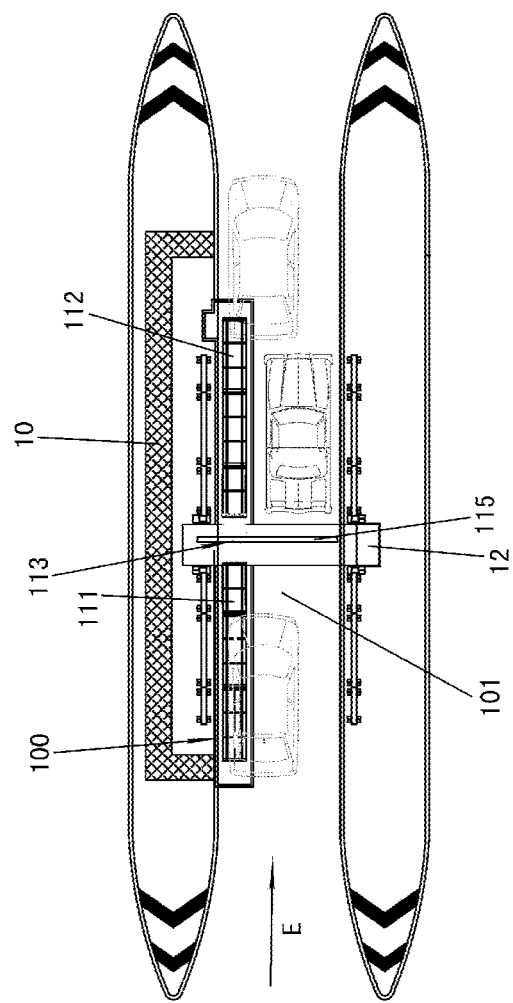
FIG. 6 is a top view of an implementation of a vehicle dragging system in an application example.

FIG. 6 shows a vehicle dragging system 100 applicable to a vehicle check system. In FIG. 6, 101 denotes a check passage, and 100 denotes a vehicle dragging system. As shown in FIG. 6, the vehicle dragging system 100 includes: a first dragging device 111 and a second dragging devices which are successively arranged in a direction E of dragging a vehicle. In the direction E of dragging the vehicle, the first dragging device 111 is disposed upstream the second dragging device 112, and a spacing portion 113 is provided between the first dragging device 111 and the second dragging device 112, so that the first dragging device 111 is separated from the second dragging device 112 for a predetermined distance in the direction E of dragging the vehicle. Both the first dragging device 111 and the second dragging device 112 are disposed in the check passage 101. At least one portion of a path of rays of a ray check system passes through the spacing portion 113 between the first dragging device 111 and the second dragging device 112.

Figure 17:
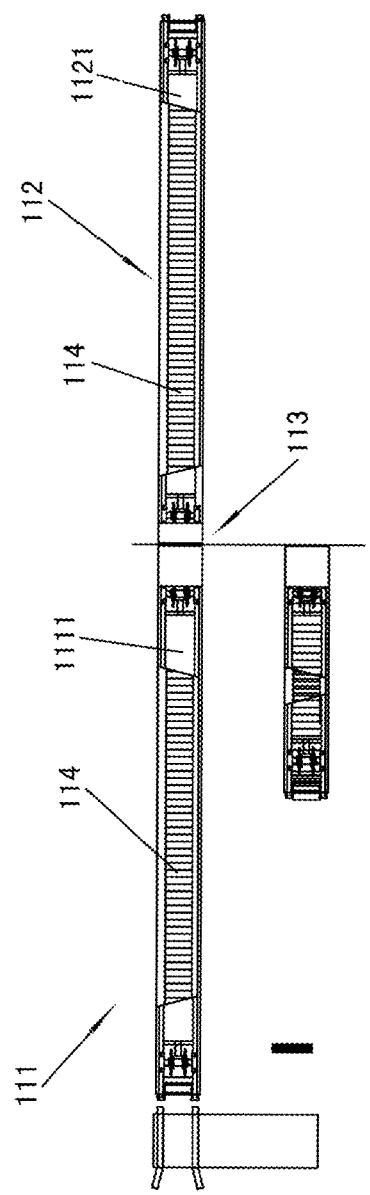
FIG. 17 is a top view of the vehicle dragging system, wherein a dragging device of the vehicle dragging system includes a plate chain.

As shown in FIG. 17, the first dragging device 111 includes a first support plate 1111, a first chain 114 (an example of an elongate traction member) and a first push component 1141 connected to the first chain 114. The first push component 1141 is operated around the first support plate 1111 for pushing a wheel to move along the first support plate 1111 so as to advance the vehicle. The second dragging device 112 includes a second support plate 1121, a second chain 114 (an example of the elongate traction member) and a second push component 1141 connected to the second support chain 114. The second push component 1141 is operated around the second support plate 1121 for pushing a wheel to move along the second support plate 1121 so as to advance the vehicle.

Figure 7:
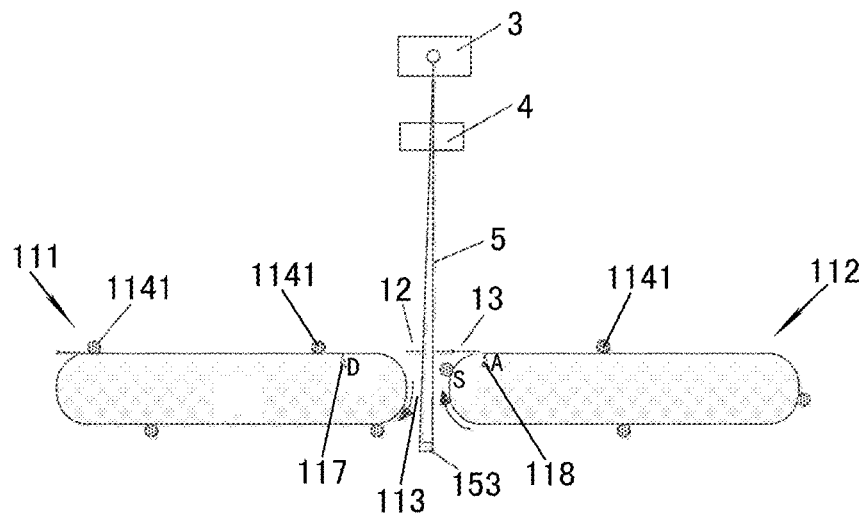
FIG. 7 is an operation schematic diagram of the vehicle dragging system.

Referring to FIG. 7, the vehicle dragging system further includes a controller (not shown). The controller controls the first push component 1141 to push a first wheel of the vehicle at a first speed. When a second wheel of the vehicle arrives at a predetermined position A of the second dragging device 112 having a predetermined distance away from the spacing portion 113, the second chain 114 is moved, so that the second push component 1141 on the lower side of the second support plate 1121 is moved to come into contact with the second wheel of the vehicle at a second speed and push the second wheel of the vehicle, so as to maintain a miming state of the vehicle. The second wheel is located downstream the first wheel in the direction E of dragging the vehicle. The second speed may be greater than or equal to the first speed, and both the second speed and the first speed may be basically constant. Before the first push component 1141 is separated from the first wheel, the second push component 1141 is in contact with the second wheel.

As shown in FIG. 7, the vehicle dragging systems further includes: a sensor 118 for sending out a signal when the second wheel of the vehicle advances to the predetermined position A. The sensor 118 is provided at the predetermined position A of the second dragging device 112 having a predetermined distance away from the spacing portion 113. After the controller receives the signal from the sensor 118, the second chain 114 is accelerated, and the second push component 1141 on the lower side of the second support plate 1121 is allowed to move for a predetermined time, then come into contact with the second wheel of the vehicle at the second speed and push the second wheel of the vehicle. The sensor 118 may be a pressure sensor, a photoelectric sensor, a piezoelectric sensor or the like. The pressure sensor, photoelectric sensor, piezoelectric sensor or the like is disposed at the predetermined position A of the second dragging device 112.

For example, as shown in FIG. 7, the vehicle moves from left to right, and the push component 1141 of the first dragging device 111 pushes a rear wheel of the vehicle so as to allow the vehicle to move rightward at the first speed V. When the front wheel of the vehicle arrives at a sensor 117 disposed at a predetermined position D, the push component 1141 on the second dragging device 112 is stopped at a point S.

After the controller receives the signal from the sensor 118 when the front wheel of the vehicle arrives at the predetermined position A, the second chain 114 is accelerated and then decelerated to the second speed. The accelerated motion may be a uniformly accelerated motion, and the decelerated motion may be a uniformly decelerated motion. The push component 1141 of the second dragging device 112 is accelerated to a speed V2 (V2>V), then maintained at the speed V2 and pushes the front wheel of the vehicle to move. The accelerated motion of the push component 1141 may be a uniformly accelerated motion.

Both the first dragging device 111 and the second dragging device 112 are disposed on one side inside the check passage 101, so that the vehicle running into the check passage 101 can be dragged to pass through the check passage 101. The first dragging device 111 pushes the rear wheel of the vehicle and then the second dragging device 112 pushes the front wheel of the vehicle, so that the vehicle passes through the spacing portion 113 provided between the first dragging device 111 and the second dragging device 112.

FIG. 7 shows a schematic diagram of the vehicle check system including the first dragging device 111 and the second dragging device 112. The spacing portion 113 is provided between the first dragging device 111 and the second dragging device 112, and rays 5 pass through the spacing portion and then irradiate on a detector 153.

Preferably, as shown FIG. 6 and FIG. 7, a platform 12 is provided on the spacing portion 113 between the first dragging device 111 and the second dragging device 112, for convenience of allowing the vehicle to run on the spacing portion 113 between the first dragging device 111 and the second dragging device 112. An upper surface of the platform 12 and the ground plane in the check passage are in the same height. A slit 115 may be formed in the middle of the platform 12, so that there is no blockage in a ray path from a collimator 4 to the detector 153, and thus no blockage for scanning in the whole dragging device is really realized.

Alternatively, the same material having the same thickness may be provided in the slit 115 of the platform 12 for purpose of improving the closure of the system. This nearly has no impact on a scan image because the same material having the same thickness is equivalent to a uniform background added on the image. Of source, the selection of the material should comprehensively consider the loss of ray penetrability, the physical strength and price of the material, for example, aluminum, iron, plastics, carbon fiber or other materials.

As shown in FIG. 7, a turnover plate 13 is convenient to allow wheels of a vehicle to pass through and also may allow the push component 1141 on the second dragging device 112 to pass through. The turnover plate 13 may rotate around a pivot. The pivot is perpendicular to an extension direction of the second dragging device 112 or the direction E.

Figure 8:
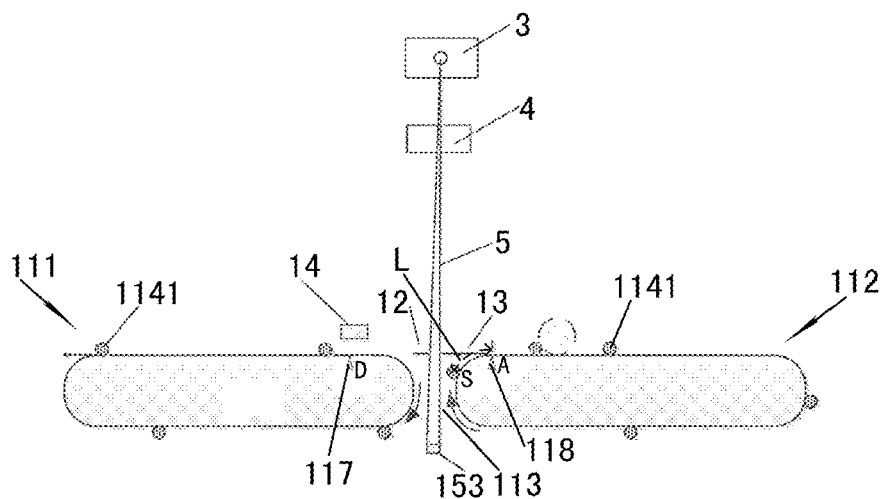
FIG. 8 is another schematic diagram of the vehicle dragging system.

In addition, in order to make the vehicle to pass through the spacing portion 113 between the first dragging device 111 and the second dragging device 112 at a constant speed, different from the situation shown in FIG. 7, as shown in FIG. 8, an image acquisition device 14 is disposed on one side of the check passage 101 (close to the first dragging device 111) and positioned near a predetermined position D.

As shown in FIG. 8, the vehicle dragging system further includes: a wheel diameter acquisition device for measuring the diameter of the second wheel of the vehicle, and a calculation device. The calculation device calculates, according to the diameter of the second wheel acquired by the wheel diameter acquisition device and the position of the second push component 1141 on the lower side of the second support plate 1121, a distance to be advanced by the second push component 1141 for catching up with the second wheel and coming into contact with the second wheel. The wheel diameter acquisition device may include an image acquisition device which acquires two images including the second wheel at a predetermined time interval, and then calculates the diameter of the second wheel of the vehicle according to a displacement distance of the vehicle in the two images, the first speed of the vehicle, the diameter of the second wheel of the vehicle in the images and the time interval. The image acquisition device may be a camera or a video camera 14, and is disposed at the predetermined position D of the first dragging device 111 having a predetermined distance away from the spacing portion 113 and positioned on one side of the first dragging device 111.

In addition, the wheel diameter acquisition device may be the photogrammetry system of the present invention. In other words, the device for acquiring a wheel diameter is not limited to the above device structure and may be the photogrammetry system of any one of embodiments 1 to 4 of the present invention.

In the application example, for example, as shown in FIG. 8, the vehicle moves from left to right, and the push component 1141 of the first dragging device 111 pushes the rear wheel of the vehicle to allow the vehicle to move rightward at the first speed V. When the front wheel of the vehicle arrives at the sensor 117 disposed at the predetermined position D (ground), the push component 1141 on the second dragging device 112 is stopped at the point S, and the camera or video camera 14 is activated to photograph the vehicle. After a short time interval t, the camera or video camera 14 photographs the vehicle again. The camera or video camera 14 may clearly photograph the front wheel of the vehicle and neighboring regions thereof.

Figure 9:
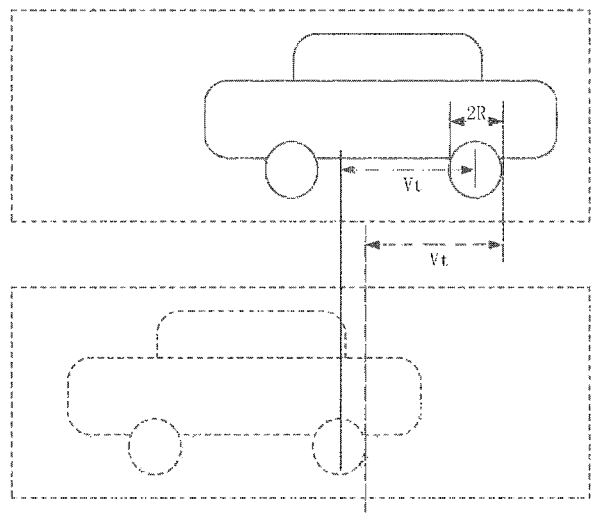
FIG. 9 is a schematic diagram of measurement through two times of photographing.

As shown in FIG. 9, the camera or video camera 14 takes a picture of a vehicle to be checked, and then takes a picture again at a time interval t. The vehicle runs at a speed V, and the vehicle advances a distance Vt within a time t. The outer diameter of the front wheel of the vehicle on the pictures is measured, and the movement distance of the vehicle on the two pictures is measured. The two measurements may be manually measured on the pictures, or may be automatically processed by an image processing algorithm. The outer diameter of the front wheel of the vehicle is:

$$2R = Vt \times \frac{\text{the outer diameter of the front wheel of the vehicle on the pictures}}{\text{the displacement distance of the vehicle on the two pictures}} \qquad (4)$$

The wheel outer diameter measurement device may be the photogrammetry system of the present invention. In other words, the wheel outer diameter measurement device is not limited to the above device structure and may be the photogrammetry system of any one of embodiments 1 to 4 of the present invention.

Thus, the outer diameter of the front wheel of the vehicle may be measured. The measurement of the outer diameter of the front wheel is important to the contact of the second push component 1141 of the second dragging device 112 at a predetermined speed with the wheel of the vehicle. Of course, when the outer diameter of the front wheel is known, the running speed may be in turn measured. Or, when the outer diameter of the front wheel and the running speed are known, the time interval may be measured using this technology.

Figure 10:
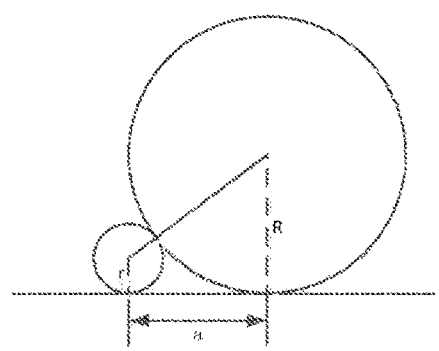
FIG. 10 is a positional relation diagram when a push component such as a roller comes into contact with a vehicle wheel.

As shown in FIG. 10, in the case where the push component 1141 is a roller, after the diameter of the front wheel is measured, a relative distance a between the front wheel and the push component 1141 may be accurately calculated when the push component 1141 of the second dragging device 112 pushes the front wheel. As the diameter 2R of the front wheel and the radius r of the push component 1141 are known, the following equation may be obtained:

$$a = \sqrt{(R+r)^2 - (R-r)^2} = 2\sqrt{Rr} \qquad (5).$$

For example, when the front wheel of the vehicle arrives at the sensor 118 at the predetermined position A, the push component 1141 of the second dragging device 112 is accelerated to a speed V3 (V3>V) and then gradually decelerated to a speed V and pushes the front wheel of the vehicle to move. The movement speed-time relation of the push component 1141 of the second dragging device 112 is preferably shown in FIG. 11A. The push component 1141 is accelerated to the speed V3 from a static state through time t1 and then decelerated to V through time t2. As shown in FIG. 8, the distance from position S to position A is L. The push component 1141 runs after the front wheel, and is required to run an additional distance L−a than the vehicle within the time t1+t2. The push component 1141 is moved according to the speed-time curve shown in FIG. 11:

$$L-a = 0.5 \times [V3 \times t1 + (V3+V) \times t2] - V \times (t1+t2) \qquad (6),$$

where V3, t1 and t2 may be flexibly designed as required. However, before the rear wheel arrives at the platform 12 of FIG. 8, the push component 1141 has to catch up with the front wheel at a speed V. By the way, the measurement of L may be calculated according to the accurate size of the second dragging device 112, or may be reckoned according to the interval between the time of passing through the position S at the constant speed and the time of passing through the position A at the constant speed, which can be used as a parameter of the system.

Preferably, the accelerated motion and decelerated motion of the push component 1141 are uniformly accelerated motion and uniformly decelerated motion.

Figures 11A, 11B:
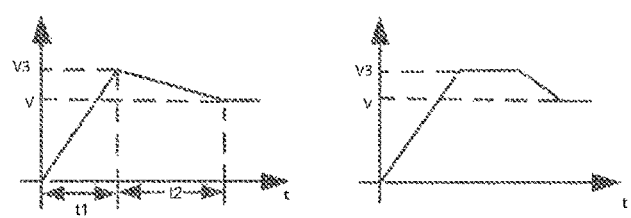
FIG. 11A and FIG. 11B are speed-time curves of a push component such as a roller.

Apparently, the process in which the push component 1141 runs after the front wheel may be performed according to other speed-time curves, for example, the speed-time curve in FIG. 11B. When the front wheel of the vehicle arrives at the predetermined position A, the push component 1141 is accelerated to a speed V3, then advances at the constant speed of V3, and is decelerated to V and catches up with the front wheel of the vehicle.

As the movement speed of the vehicle is maintained at V, it is not required to change the beam-out frequency of an X-ray generation device 3, so that the control complexity of the beam-out and detection system is reduced. In addition, just due to the use of the photogrammetry device of the present invention, accurate control may be realized, so that transition is stably performed from the first dragging device 111 to the second dragging device 112 (that is, the speed V remains unchanged during transition).

As described above, the vehicle passing through the spacing portion 113 at a constant speed is realized, and no blockage of the dragging devices with respect to scanning rays is also realized. A wheel outer diameter measurement method is further provided. However, the system is slightly complicated, including the measurement of the distance L in FIG. 8. Another mode will be given below. This mode is continuously based on the measurement of wheel outer diameter, the vehicle is maintained at a constant speed, and it is not required to measure the value of L.

Figure 12:
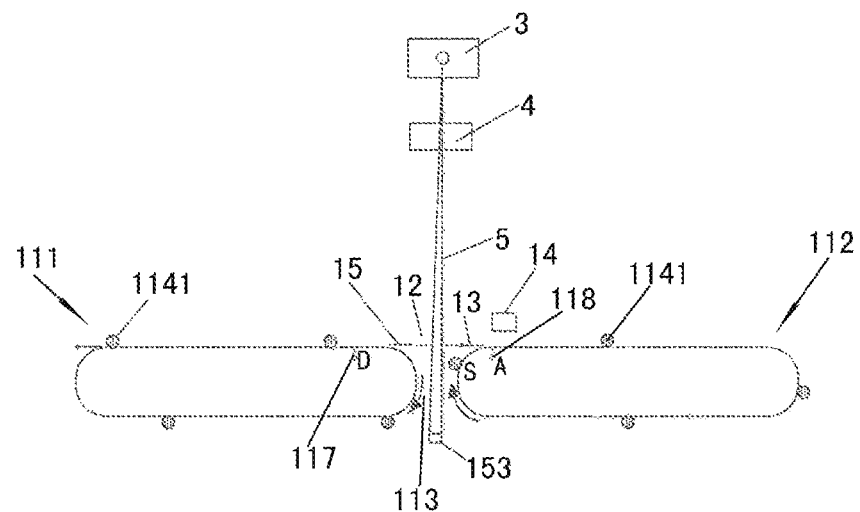
FIG. 12 is a schematic diagram of another mode of the vehicle dragging system.

Compared with the above mode, the system deployment mainly has the following alterations: the image acquisition device 14 is changed from the predetermined position D to the predetermined position A and close to one side of the dragging device, as shown in FIG. 12.

As shown in FIG. 12, the vehicle dragging system may further include a distance acquisition device for measuring a distance between the second wheel of the vehicle and the second push component 1141. When the second wheel of the vehicle advances to the predetermined position A of the second dragging device 112 having a predetermined distance away from the spacing portion 113, the distance acquisition device acquires the distance between the second wheel and the second push component 1141 to serve as a distance to be advanced by the second push component 1141 for catching up with the second wheel and coming into contact with the second wheel.

Referring to FIG. 12, the distance acquisition device may include an image acquisition device. The image acquisition device 14 may acquire two images including the second wheel and the second push component 1141 at a predetermined time interval, and then calculates, according to the displacement distance of the vehicle in the two images, the distance between the second wheel and the second push component 1141, the first speed of the vehicle and the time interval, the distance between the second wheel and the second push component 1141. The image acquisition device may be a camera or a video camera, and may be disposed at the predetermined position A of the second dragging device 112 having a predetermined distance away from the spacing portion 113 and positioned on one side of the second dragging device 112.

Thus, the image acquisition device not only may acquire the diameter of the second wheel of the vehicle, but also may acquire the distance between the second wheel and the second push component 1141. The distance is a basis of calculating the distance to be advanced by the second push component 1141 for catching up with the second wheel and coming into contact with the second wheel. It is not hard to understand that the accurate chasing distance should be equal to a distance obtained by subtracting this distance by the distance (i.e., a in the formula (5) for a push roller or other circular push components) of the both in the advancing direction of the vehicle when the second wheel is in contact with the second push component.

Similarly, the distance acquisition device may be the photogrammetry system of the present invention. In other words, the distance acquisition device is not limited to the above device structure and may be the photogrammetry system of any one of embodiments 1 to 4 of the present invention.

As shown in FIG. 12, the vehicle dragging system further includes a sensor 118 for sending out a signal when the second wheel of the vehicle advances to the predetermined position A of the second dragging device 112 having a predetermined distance away from the spacing portion 113. After the controller receives the signal from the sensor 118, the distance acquisition device is operated to acquire the distance between the second wheel and the second push component 1141. The sensor 118 may be a pressure sensor, a photoelectric sensor, a piezoelectric sensor or the like. The pressure sensor, photoelectric sensor, piezoelectric sensor or the like is disposed at the predetermined position A of the second dragging device 112.

Figure 13:
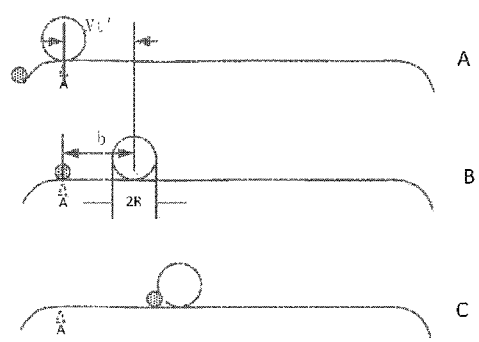
FIG. 13 is a schematic diagram of controlling a push component.

Preferably, as shown in FIG. 12, the vehicle moves from left to right, and the push component 1141 of the first dragging device 111 pushes the rear wheel of the vehicle so as to allow the vehicle to move rightward at the first speed V. When the front wheel of the vehicle arrives at the first sensor 117 disposed at the predetermined position D, the push component 1141 on the second dragging device 112 is stopped at the point S and starts to be activated to a speed V4 (V4>V). When the front wheel of the vehicle arrives at the second sensor 118 (photoelectric sensor or piezoelectric sensor) at the second predetermined position A, the vehicle and the front wheel thereof are photographed, as shown in FIG. 13A. When the push component 1141 on the second dragging device 112 arrives at the second sensor 118 at the predetermined position A, the vehicle and the front wheel are photographed again, as shown in FIG. 13B. A system timer (not shown) records a time interval t' of the two times of photographing Similar to the principle for measuring the outer diameter 2R of the front wheel, it is easy to obtain the following equation:

$$2R = Vt' \times \frac{\text{the outer diameter of the front wheel of the vehicle on the pictures}}{\text{the displacement distance of the vehicle on the two pictures}}. \quad (7)$$

During the second time of photographing, the distance between the push component 1141 and the front wheel of the vehicle on the picture is also measured. Then, the actual distance b from the push component 1141 to the front wheel of the vehicle satisfies the following formula:

$$b = Vt' \times \frac{\text{the distance between the push component and the front wheel of the vehicle on the picture}}{\text{the displacement distance of the vehicle on the two pictures}}. \quad (8)$$

In this case, the push component 1141 needs to run a distance b-a to catch up with the front wheel of the vehicle (a is obtained by substituting R calculated by the formula (4) into the formula (5)).

Figures 14A, 14B:
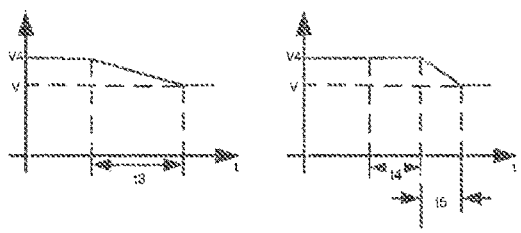
FIG. 14A and FIG. 14B are schematic diagrams showing speed-time curves of a push component such as a roller.

When the push component 1141 arrives at the predetermined position A, the push component 1141 begins to be uniformly decelerated to the speed V for time t3, and catches up with the front wheel of the vehicle (as shown in FIG. 13C). The speed-time curve is as shown in FIG. 14A, thus:

$$b-a=0.5\times(V4-V)t3 \quad (9).$$

The accelerated speed is equal to:

$$p=(V-V4)/t3 \quad (10).$$

From the front wheel arriving at the predetermined position A to the push component 1141 catching up with the front wheel, the running distance of the vehicle is equal to V(t'+t3). As shown in FIG. 12, the distance from the edge of the first dragging device 111 to the predetermined position A is g. To ensure that the second push component 1141 of the second dragging device 112 comes into contact with the second wheel (for example, the front wheel) before the first push component 1141 of the first dragging device 111 is separated from the first wheel (for example, the rear wheel), it is assumed that the minimum distance between the front and rear wheels of all common vehicles is equal to M, so:

$$V(t'+t3)+g<M \quad (11)$$

The system design must satisfy this condition.

The system parameters and control parameters (accelerated speed p, speed V4, time intervals t' and t3) are designed according to the formulae 9 to 11, and the intermediate calculation is completed by the formulae 7 to 8. Thus, the vehicle stably passing through the spacing portion 113 at a constant speed may be realized.

Of course, the speed-time curve of the push component 1141 may be changed from FIG. 14A to FIG. 14B. In other words, after arriving at the predetermined position A, the push component 1141 continues to run at a constant speed for a time t4, then is uniformly decelerated to the speed V for a time t5 and catches up with the front wheel of the vehicle. This way is advantageous for quickening the chasing process. Moreover, an adjustable time parameter is added, so that the flexibility of the system design is improved. Of course, this solution is more complicated in control than the solution of FIG. 14A. Actually, the push component 1141 may catch up with the front wheel according to various speed-time curves, including a variable accelerated motion, as long as the speed of the push component 1141 is equal to the speed of the vehicle before the push component 1141 catches up with the front wheel.

In this mode, the positioning of the predetermined position D and the predetermined position S is not necessarily accurate, so that the system cost may be further reduced.

As shown in FIG. 12, to allow the vehicle stably pass through the spacing portion 113 between the first dragging device 111 and the second dragging device 112, a pedal 15 may be provided in the system. When the front wheel arrives at the predetermined position D, the pedal 5 is extended out to allow the front wheel to stably pass through. After the front wheel has passed through, the pedal 15 is retracted. Of course, the pedal 15 may be cancelled in the case where the requirement for the stable running of a vehicle is not particularly high or the diameter of the push component 1141 is small enough.

Actually, in virtue of the technology of the present invention, using the speed-time curve, the speed of the vehicle pushed by the first dragging device 111 and the second dragging device 112 may be arbitrarily controlled so as to meet various application requirements.

Figure 15:
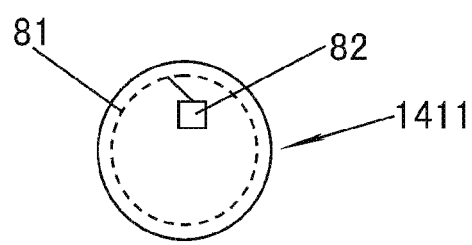
FIG. 15 shows that a push component is provided with a detection device for detecting whether the push component is in contact with a wheel of a vehicle and a feedback device.

As shown in FIG. 15, the vehicle dragging system further includes a sensor 81. The sensor 81 is disposed on the second push component 1141 and used for detecting whether the second push component 1141 has been in contact with the second wheel (for example, the front wheel) of the vehicle. The sensor may be a contact sensor, a pressure sensor, a piezoelectric sensor or the like. The vehicle dragging system further includes a feedback device 82. The sensor detects whether the second push component 1141 has been in contact with the front wheel and then informs the controller of the vehicle check system through the connected feedback device 82. The controller of the vehicle check system receives a signal indicating that the second push component 1141 has been in contact with the second wheel (for example, the front wheel) of the vehicle, and then may control the second dragging device 112 to push the vehicle to advance at a speed larger than the push speed of the first dragging device 111. Alternatively, as another preferred solution, the vehicle check system receives a signal indicating that the second push component 1141 has been in contact with the second wheel (for example, the front wheel) of the vehicle, and then may control the second dragging device 112 to push the vehicle to advance at a speed equal to the push speed of the first dragging device 111, i.e., to realize the constant-speed dragging of the vehicle.

Preferably, the sensor 81 is a piezoelectric sensor. Preferably, the feedback device includes a radio signal transmission unit for transmitting a signal to the controller of the vehicle check system.

Figure 16:
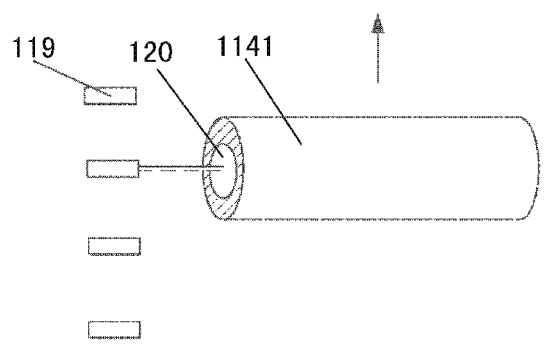
FIG. 16 shows a position detection device for detecting whether the push component reaches a predetermined position.

In addition, as shown in FIG. 16, the vehicle check system further includes a position detection device 119 for detecting whether the push component 1141 arrives at a predetermined position and sending a signal to the controller, when the push component pushing a wheel of the vehicle or the push component as the dragging device is idle arrives at the predetermined position, so as to activate a ray check system to scan the vehicle or the idle dragging device. The position detection device 1141 may be an optical transceiver, which is disposed on one side of the dragging device and emits a light beam to one side of the dragging device. When the light beam irradiates on a reflector 120 at an end portion of the push component 1141, the optical transceiver receives the light beam reflected by the reflector 120 at the end portion of the push component 1141 and thus determines that the push component 1141 arrives at the predetermined position.

Although some embodiments of the overall concept of the present invention have been shown and described, a person of ordinary skill in the art should understand that alterations may be made to these embodiments without departing from the principle and spirit of the overall concept of the present invention, and the scope of the present invention is defined by the claims and equivalents thereof.

The invention claimed is:

1. A photogrammetry method, comprising the following steps:
   (a) in a direction perpendicular to a direction of movement of an object to be measured with respect to photographing devices, photographing, by the photographing devices, the object to be measured two times at a predetermined time interval to obtain two images, respectively; and
   (b) according to a length Lp of the object to be measured or at least one portion of the object to be measured in the two images obtained by the photographing devices, a transverse movement distance Dp of the object to be measured or the least one portion of the object to be measured in the two images, and a speed of the object to be measured, calculating an actual length L of the object to be measured or the at least one portion of the object to be measured;
   the object to be measured moves at a speed V, and, in step (a), the photographing devices photograph the object to be measured two times at a time interval t, or the object to be measured is stationary, and, in step (a), the photographing devices move at a speed V in a direction perpendicular to a photographing direction and photograph the object to be measured for two times at a time interval t; and
   in step (b), the transverse movement distance Dp of the object to be measured or the at least one portion of the object to be measured in the two images obtained by the two times of photographing and the length Lp of the object to be measured or the at least one portion of the object to be measured in the images are obtained, and then the actual length L of the object to be measured or the at least one portion of the object to be measured is obtained by the following formula:

$$L = Lp \times \frac{Vt}{Dp};$$

wherein Dp is a non-zero, real number.

2. A photogrammetry method, comprising the following steps:
   (a) in a direction perpendicular to a direction of movement of an object to be measured with respect to photographing devices, photographing, by the photographing devices, the object to be measured two times at a predetermined time interval to obtain two images, respectively; and
   (b) according to a length Lp of the object to be measured or at least one portion of the object to be measured in the two images obtained by the photographing devices, a transverse movement distance Dp of the object to be measured or the least one portion of the object to be measured in the two images, and a speed of the object to be measured, calculating an actual length L of the object to be measured or the at least one portion of the object to be measured;
   the object to be measured is stationary, and, in step (a), the photographing devices photograph the object to be measured at two positions having a distance S therebetween to obtain two images, respectively; and
   in step (b), the transverse movement distance Dp of the object to be measured or the at least one portion of the object to be measured in the two images and the length Lp of the object to be measured or the at least one portion of the object to be measured in the two images are obtained, and then the actual length L of the object to be measured or the at least one portion of the object to be measured is obtained by the following formula:

$$L = Lp \times \frac{S}{Dp};$$

wherein Dp is a non-zero, real number.

3. A photogrammetry method, comprising the following steps:
  (a) in a direction perpendicular to a direction of movement of an object to be measured with respect to photographing devices, photographing, by the photographing devices, the object to be measured two times at a predetermined time interval to obtain two images, respectively; and
  (b) according to a length of the object Lp to be measured or at least one portion of the object to be measured in the two images obtained by the photographing devices, a transverse movement distance Dp of the object to be measured or the least one portion of the object to be measured in the two images, and a speed of the object to be measured, calculating an actual length L of the object to be measured or the at least one portion of the object to be measured;
  in the photogrammetry method, a first photographing device and a second photographing device successively arranged at a predetermined distance in a direction parallel to the direction of movement of the object to be measured are used; and in step (a), the first photographing device photographs a picture of the object to be measured, and the second photographing device shoots a video of the object to be measured;

in step (b), frames of the video obtained by the second photographing device are retrieved to obtain a frame image most approximate to the picture obtained by the first photographing device, and a difference between the time of taking the picture and the time of taking the frame image is calculated to obtain a movement speed V of the object to be measured;

in step (b), two frames are extracted from the frames of the video obtained by the second photographing device, a time interval t between the two frames is calculated, the transverse movement distance Dp of the object to be measured or the least one portion of the object to be measured in the two frames and the length Lp of the object to be measured or at least one portion of the object to be measured in the frame image are measured, and the actual length L of the object to be measured or the at least one portion of the object to be measured is obtained by the following formula in combination with the obtained movement speed V of the object to be measured:

$$L = Lp \times \frac{Vt}{Dp};$$

wherein Dp is a non-zero, real number.

* * * * *